United States Patent
Ramirez Ruiz

(10) Patent No.: US 8,930,075 B2
(45) Date of Patent: Jan. 6, 2015

(54) CONTROL METHOD OF AN ACTIVE SUSPENSION OF A CAR

(71) Applicant: Ferrari S.p.A., Modena (IT)

(72) Inventor: Isabel Ramirez Ruiz, Montale (IT)

(73) Assignee: Ferrari S.p.A. (IT)

( * ) Notice: Subject to any disclaimer, the term of this patent is extended or adjusted under 35 U.S.C. 154(b) by 0 days.

(21) Appl. No.: 13/734,452

(22) Filed: Jan. 4, 2013

(65) Prior Publication Data

US 2013/0197756 A1  Aug. 1, 2013

(30) Foreign Application Priority Data

Jan. 5, 2012  (IT) .............................. BO2012A0003

(51) Int. Cl.
  *B60G 17/016*  (2006.01)
  *B60G 7/00*  (2006.01)
  *B60G 17/018*  (2006.01)
  *B62D 17/00*  (2006.01)

(52) U.S. Cl.
  CPC ............ *B60G 17/0163* (2013.01); *B60G 7/003* (2013.01); *B60G 17/0164* (2013.01); *B60G 17/0182* (2013.01); *B62D 17/00* (2013.01); *B60G 2200/46* (2013.01); *B60G 2200/4622* (2013.01); *B60G 2204/62* (2013.01); *B60G 2401/16* (2013.01); *B60G 2401/28* (2013.01); *B60G 2800/22* (2013.01); *B60G 2800/24* (2013.01); *B60G 2800/962* (2013.01)
  USPC .............................................. 701/40; 701/37

(58) Field of Classification Search
  CPC .............. B60G 1/003; B60G 17/0163; B60G 17/0164; B60G 17/082; B60G 7/003; B60G 17/0182; B60G 2200/46; B60G 2200/4622; B60G 2200/422; B60G 3/26; B62D 17/00
  USPC ................. 701/40, 38, 48, 37; 280/5.5, 5.52, 280/5.521, 5.522, 86.758, 99, 86.757, 280/86.751, 124.136
  See application file for complete search history.

(56) References Cited

U.S. PATENT DOCUMENTS

| | | | |
|---|---|---|---|
| 4,371,191 | A | 2/1983 | Goldberg et al. |
| 5,438,515 | A | 8/1995 | Miichi et al. |

(Continued)

FOREIGN PATENT DOCUMENTS

| | | |
|---|---|---|
| FR | 2895349 A1 | 6/2007 |
| JP | 5032112 A | 2/1993 |

OTHER PUBLICATIONS

"European Application No. BO20120003, European Search Report issued Oct. 16, 2012", 2 pgs.

*Primary Examiner* — Marthe Marc-Coleman
(74) *Attorney, Agent, or Firm* — Schwegman Lundberg & Woessner, P.A.

(57) ABSTRACT

A control method for an active suspension of a vehicle, wherein the determination of an optimal camber angle of the active suspension includes the steps of: estimating the slip angle of the wheel of the active suspension; estimating the vertical force which weighs on the wheel of the active suspension; estimating the transverse force which is transferred to the ground by the wheel of the active suspension as a function of the slip angle of the wheel of the active suspension and as a function of the vertical force which weighs on the wheel of the active suspension; and determines the optimal camber angle as a function of the transverse force which is transferred to the ground by the wheel of the active suspension.

14 Claims, 5 Drawing Sheets

(56) References Cited

U.S. PATENT DOCUMENTS

| | | | |
|---|---|---|---|
| 6,874,793 B2 * | 4/2005 | Choudhery | 280/5.521 |
| 7,914,020 B2 * | 3/2011 | Boston | 280/86.751 |
| 2009/0302560 A1 * | 12/2009 | Koguchi | 280/5.521 |
| 2012/0035784 A1 * | 2/2012 | Gauger | 701/1 |

* cited by examiner

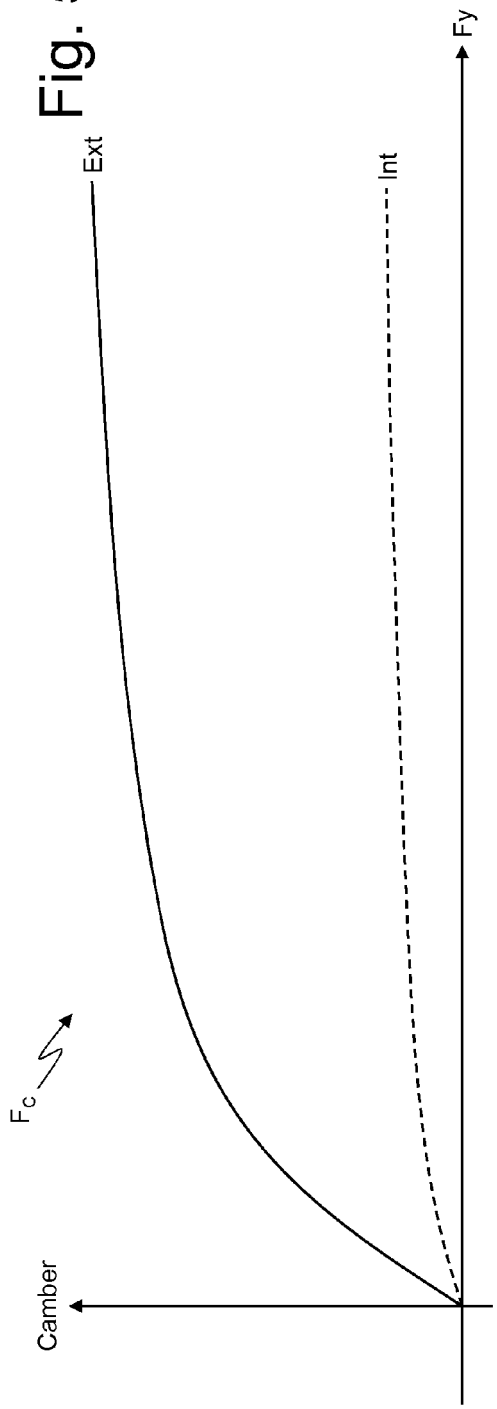
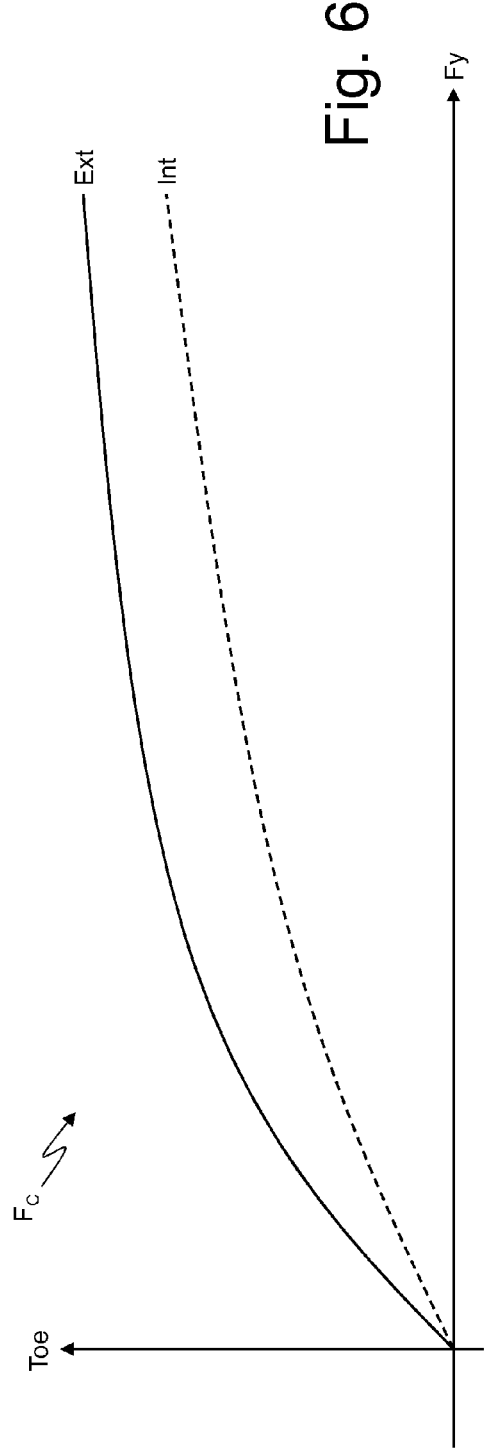

CONTROL METHOD OF AN ACTIVE SUSPENSION OF A CAR

PRIORITY CLAIM AND RELATED APPLICATIONS

This application claims the benefit of priority under 35 U.S.C. Section 119 to Italian Patent Application Serial No. BO2012A 000003, filed on Jan. 5, 2012, which application is incorporated herein by reference in its entirety.

TECHNICAL FIELD

The present invention relates to a control method of an active suspension of a vehicle.

BACKGROUND PRICK ART

The characteristic angles of a vehicle suspension are the toe angle and the camber angle.

The total toe angle is the angle formed by the rolling planes of the two wheels of the same axle observing the vehicle from the top (each wheel has its own toe angle which is equal to a fraction of the total toe angle); the toe angle is positive if the two planes cross in front of the concerned axle (with respect to direction of travel) and, on the other hand, the toe angle is negative if the two planes cross behind the concerned axle (with respect to direction of travel).

The chamber angle of a wheel is the angle which is measured between the plane on which the wheel rolls and the middle trajectory perpendicular to the ground; the camber angle is negative when the wheels tend to close towards the vehicle, and therefore two rolling planes of the wheels meet over the road plane and, on the other hand, the camber angle is positive if the two rolling planes of the wheel cross under the road plane.

In a passive suspension of the traditional type, the camber and toe angles vary "passively" (i.e. without any type of external control) as a function of the forces and moments which are applied to the contact patch of the tire (elastic angle variation) and as a function of the vertical juddering of the suspension (kinematic angle variation). In a high performance sport car, the suspension geometry and the rigidity of the spring/shock absorber assembly are dimensioned so that variations of the camber and toe angles are normally very small; consequently, the actual camber and toe angles never significantly differ from the nominal camber and toe angles which are trade-offs to maximize performance, i.e. to optimize the contact patch of the tire on the ground.

Inevitably, the nominal camber and toe angles are trade-offs which always allows to have a good tire-ground contact patch without, however, ever (or hardly ever) having an optimal tire-ground contact patch. The use of active suspensions has been suggested in which, for example, the suspension arms are replaced by corresponding linear actuators which are driven to vary their length in controlled manner, and therefore vary the camber angle and the toe angle of the suspension in controlled manner in order to improve the tire-ground contact patch in all conditions.

An example of a vehicle equipped with active suspension is provided in patent application WO2008078568A1, in which an electronic control unit is connected to a steering sensor which measures the steering angle in real time and is connected to a triaxial gyroscope which is integral with the vehicle chassis and measures linear accelerations with respect to the ground and angular accelerations with respect to the ground in real time and in a three-dimensional reference system; as a function of the measurements received from the steering sensor and the triaxial gyroscope, the electronic control unit cyclically establishes the optimal camber and toe angle values of each suspension, and thus drives the linear actuators of each suspension to confer the optimal camber and toe angles to the suspension.

However, the known active suspension control methods to do not allow to manage the suspension camber and toe angles in optimal manner, particularly when maximum dynamic performance required in a high-performance sports car.

U.S. Pat. No. 4,371,191A1 describes an adjustment system of the suspensions of an automobile which actively modifies the camber angle of each wheel by means of a corresponding hydraulic actuator to optimize tire-road surface contact. U.S. Pat. No. 4,371,191A1 describes directly measuring the three forces acting on each wheel (longitudinal, lateral and vertical) by means of specific sensors, and thus determining the optimal camber angle for each wheel as a function of the three forces (longitudinal, lateral and vertical) acting on the wheel; in particular, the patent discloses that, in each suspension, the optimal camber angle is chosen to maximize the tire-road contact area as a function of the forces acting on the tire, as a function of the positive/negative toe angle of the suspension and as a function of the road surface. According to a further embodiment described in U.S. Pat. No. 4,371,191A1, the toe angles of the front wheels are also varied, in addition to the camber angles, by means of corresponding hydraulic actuators in order to optimize tire-road surface contact.

OVERVIEW

Examples of the present subject matter provide a control method for an active suspension of a vehicle which is free from the above-described drawbacks, and which is, in particular, easy and cost-effective to make.

According to the present subject matter, a control method of an active suspension of a vehicle is provided as disclosed in the appended claims.

BRIEF DESCRIPTION OF THE DRAWINGS

The present invention will now be described with reference to the accompanying drawings, which show a non-limitative embodiment thereof, in which:

FIGS. 4-6 are three charts which shows some magnitudes used by a control unit to drive the actuators of the active suspensions which regulate the toe and camber angles.

DETAILED DESCRIPTION

Figure 1:
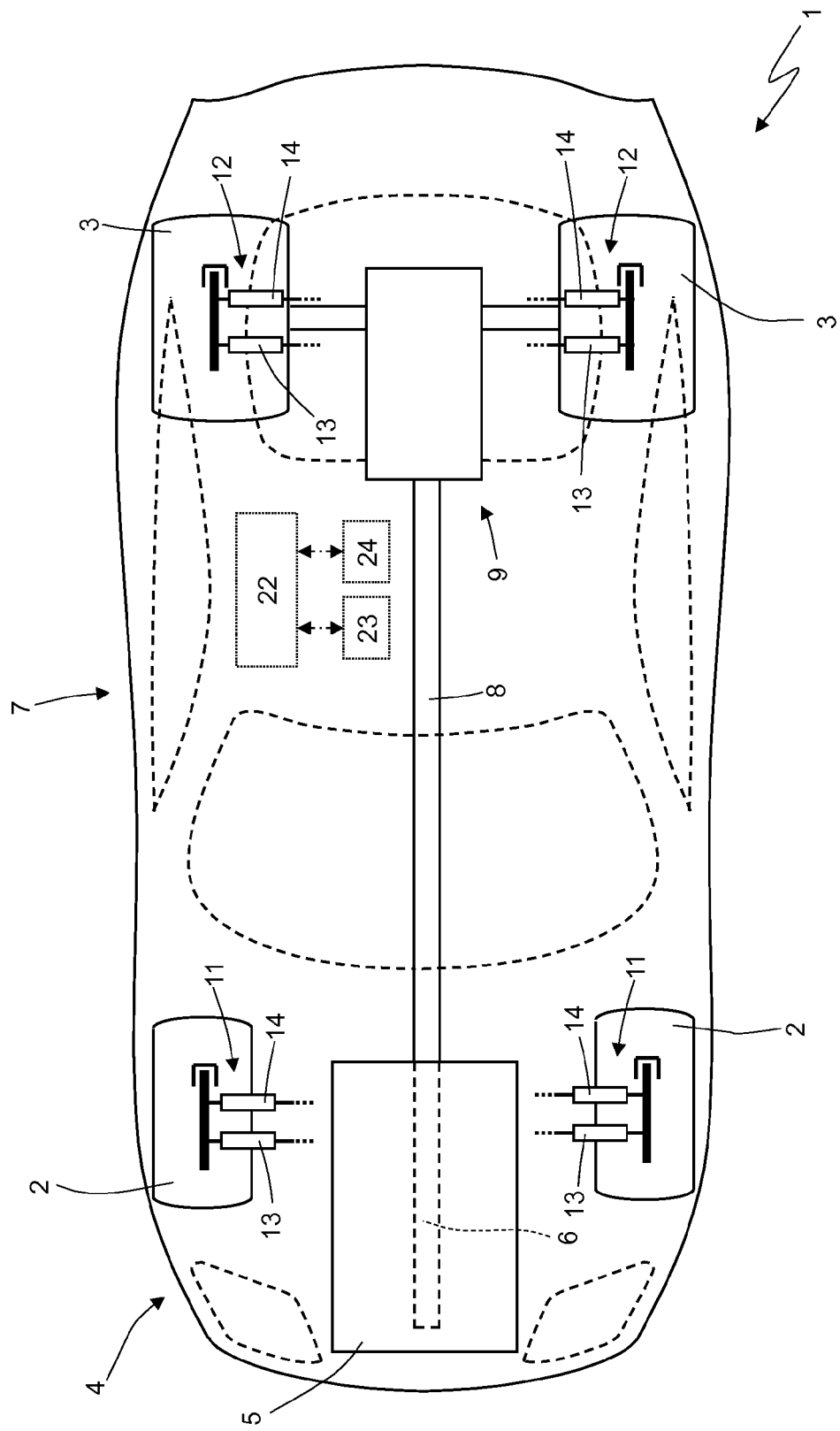
FIG. 1 is a diagrammatic, plan view of a vehicle with active suspension which is driven according to the control method of an example.

In FIG. 1, numeral 1 indicates as a whole a road vehicle provided with two front wheels 2 and two rear drive wheels 3 which receive torque from a powertrain system 4.

The powertrain system 4 comprises an internal combustion thermal engine 5, which is arranged in front position and is provided with a drive shaft 6, and an automatic manual transmission 7 (commonly named "AMT"), which transfers the torque generated by the internal combustion engine 5 to the rear drive wheels 3. The transmission 7 comprises a transmission shaft 8, which on one end is angularly integral with the drive shaft 6, and on the other end is mechanically connected to a twin-clutch gearbox 9, which is arranged in rear position and transfers motion to the rear drive wheels 3 by means of two axles shafts 12, which receive motion from a differential 12.

Each front wheel 2 is mechanically connected to a chassis 10 of the vehicle 1 (partially shown in FIG. 2) by means of a front suspension 11 of the "multi-link" type (according to a different embodiment, the front suspension 11 is of the "articulated quadrilateral" type); similarly, each rear wheel 3 is mechanically connected to the chassis 10 of the vehicle 1 by means of a rear suspension 12 of the "multi-link" type. Each suspension 11 or 12 includes a high-power electromagnetic linear actuator 13 which can be driven to vary the toe angle of the suspension 11 or 12 and a high-power electromagnetic linear actuator 14 which can be driven to vary the camber angle of the suspension 11 or 12. In particular, in each suspension 11 or 12, the electromagnetic linear actuators 13 and 14 replace the arms which connect the hub 15 (shown in FIG. 2) of the wheel 2 or 3 to the chassis 10; in this manner, by varying the length of the linear actuators 13 and 14 in controlled manner, it is possible to obtain a corresponding variation of the toe and camber angles. In other words, in each suspension 11 or 12, the electromagnetic linear actuators 13 and 14 may vary the toe and camber angles by becoming shorter and/or longer in controlled manner.

Figure 2:
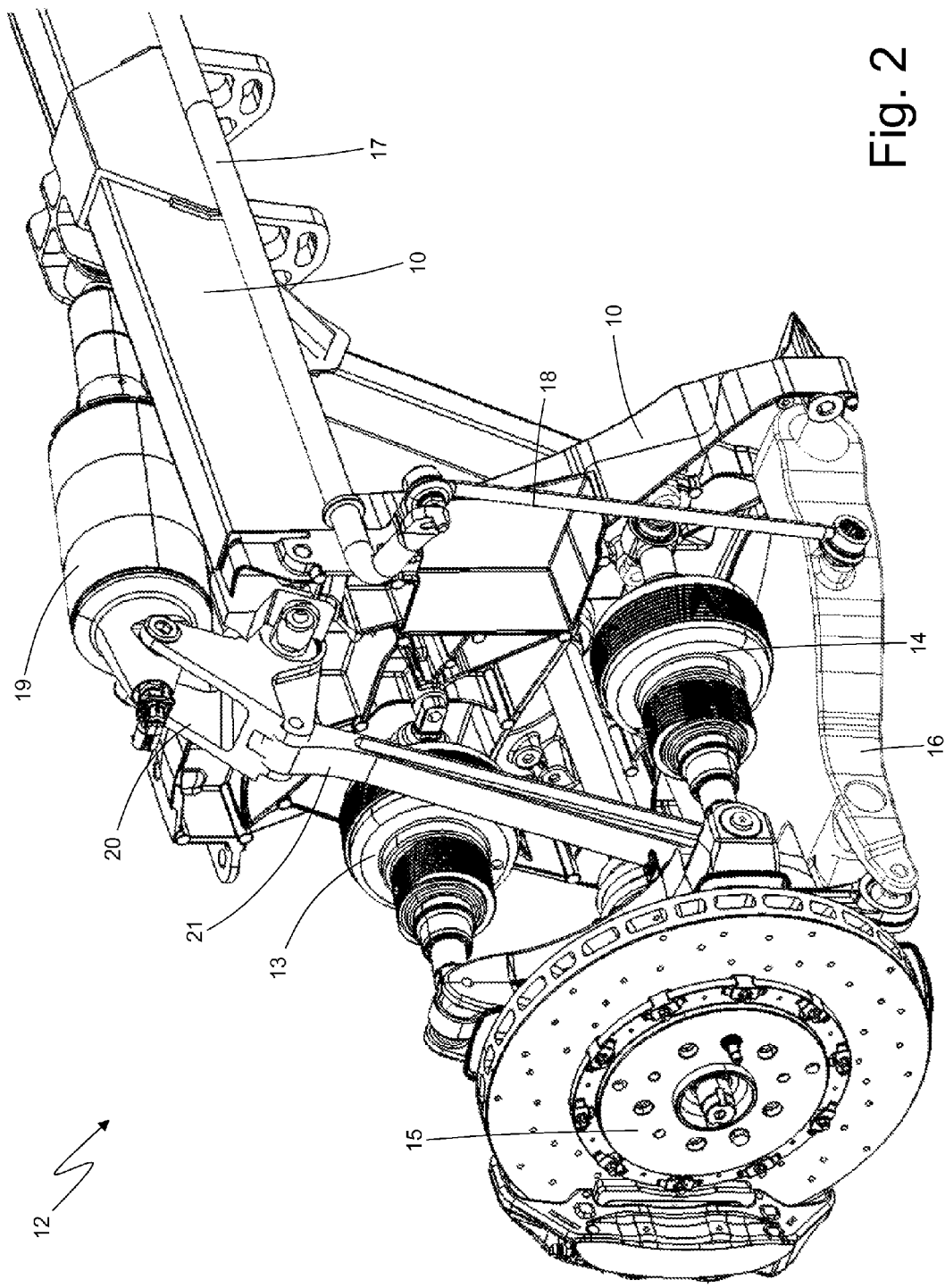
FIG. 2 is a diagrammatic perspective view, with parts removed for clarity, of an active rear suspension of the vehicle in FIG. 1.

FIG. 2 shows a perspective view of a rear suspension 12 provided with the two electromagnetic linear actuators 13 and 14 which replace the arms connecting the hub 15 of the wheel 2 or 3 to the chassis 10. FIG. 2 shows a lower control arm 16 to which an anti-roll bar 17 is mechanically connected with the interposition of a connection arm 18. FIG. 2 also shows a spring/shock absorber assembly 19 which is mechanically connected to the hub 15 by means of a rocker 20 and a push rod 21. The horizontal arrangement of the spring/shock absorber assembly 19 allows to clear the space needed to accommodate the electromagnetic linear actuators 13 and 14.

In each suspension 11 or 12, the nominal toe and camber angles are very close to zero (or null), because, by virtue of the electromagnetic linear actuators 13 and 14, it is possible in use to obtain an active correction of the toe and camber angles, i.e. to continuously vary the actual toe and camber angle values in order to have the optimal toe and camber angles in all conditions.

According to an embodiment, each suspension 11 or 12 (and in particular the electromagnetic linear actuators 13 and 14 of each suspension 11 or 12) is invested by a flow of cooling air which is conveyed through a dedicated dynamic air intake and has the function of allowing a suitable cooling of the electromagnetic linear actuators 13 and 14.

As shown in FIG. 1, an electronic control unit (ECU) 22 is provided, which controls the electromagnetic linear actuators 13 and 14 of all the suspensions 11 and to cyclically adapt the toe and camber angles according to the dynamic condition of the vehicle 1 in real time. The control unit 22 is connected to a triaxial gyroscope 23, which is provided with an aeronautic-derived static inertia platform, is integral with the vehicle chassis 10, and measures linear accelerations with respect to the ground (longitudinal, lateral and vertical accelerations) and angular accelerations with respect to the ground (rolling, pitch and yaw accelerations) in real time and in a three-dimensional reference system. Furthermore, the control unit 22 is connected to a high-accuracy satellite positioning system 24 which measures the geo-referenced position of the vehicle 1 with respect to the ground in real time.

In use, the control unit 22 cyclically establishes (i.e. at a predetermined frequency) the optimal values of the camber and toe angles of each suspension 11 or 12, and then consequently drives the electromagnetic linear actuators 13 and 14 of each suspension 11 or 12 in order to confer the optimal camber and toe angles to the suspension 11 or 12. In particular, the control unit 22 uses the measurements provided in real time by the triaxial gyroscope 23 and by the satellite positioning system 24 in order to determine the optimal toe and camber angles of the corresponding suspension 11 or 12, i.e. the toe and camber angles which allows to optimize the global force performance obtained by the tire contact patch of the wheel 2 or 3, for each wheel 2 or 3.

The movement frequencies required by the electromagnetic linear actuators 13 and 14 are higher than the steering action dynamics (i.e. the steering angle variation dynamics), and typically reach 4-10 Hz over the entire camber and to stroke of the suspensions 11 and 12 in presence of maximum loads in the tire contact patch. In each suspension 11 or 13, the force needed to vary the camber angle is always at least three times higher than the force needed to vary the toe angle.

In the embodiment shown in FIG. 1, all four suspensions 11 and 12 are active, i.e. provided with the electromagnetic linear actuators 13 and 14; according to a different embodiment (not shown), only either the two front suspensions 11 or the two rear suspensions 12 are active, while either the two rear suspensions 12 or the two front suspensions 11 are passive.

According to an embodiment, the control unit 22 controls the linear actuators 13 and 14 by using a, feedback control logic: for each suspension 11 or 12, the control unit 22 determines the desired toe and camber angle values in real time, thus the control unit 22 compares the desired toe and camber angle values with the corresponding actual toe and camber angle values to obtain the errors, which are supplied to corresponding regulators (e.g. of the PID type) to determine the driving signals of the electromagnetic linear actuators 13 and 14. The control unit 22 estimates the actual toe and camber angle values using the measurements provided in real time by the triaxial gyroscope 23, which are provided by a numerical model (known in literature) of the vehicle 1: knowing the measurements provided, in real time by the triaxial gyroscope 23, the numerical model allows to estimate the conformation of each suspension and thus the corresponding toe and camber angles with sufficient accuracy.

Using the measurements provided by the triaxial gyroscope 23 and by the satellite positioning system 24 in real time, the control unit 22 estimates the slip angle $\alpha$ value of each single wheel 2 or 3 (i.e. the angle existing between the laying plane of the wheel 2 or 3 and the velocity direction of the wheel 2 or 3). Furthermore, for each wheel 2 or 3, the control unit 22 estimates of the vertical force Fz which weighs on the wheel 2 or 3. Finally, for each wheel 2 or 3 and as a function of the slip angle $\alpha$ and of the vertical force Fz, the control unit 22 estimates the transverse force Fy which is transferred by the wheel 2 or 3 to the ground. According to the transverse force Fy which is transferred by each wheel 2 or 3 to the ground, the control unit 22 determines the optimal toe and camber angles for the corresponding suspension 11 or 12, i.e. the toe and camber angles which allow to optimize the global force obtained in the tire contact patch of the wheel 2 or 3.

The method followed by the control unit 22 to determine the transverse force Fy which is transferred by each wheel 2 or 3 to the ground is described below.

Figure 3:
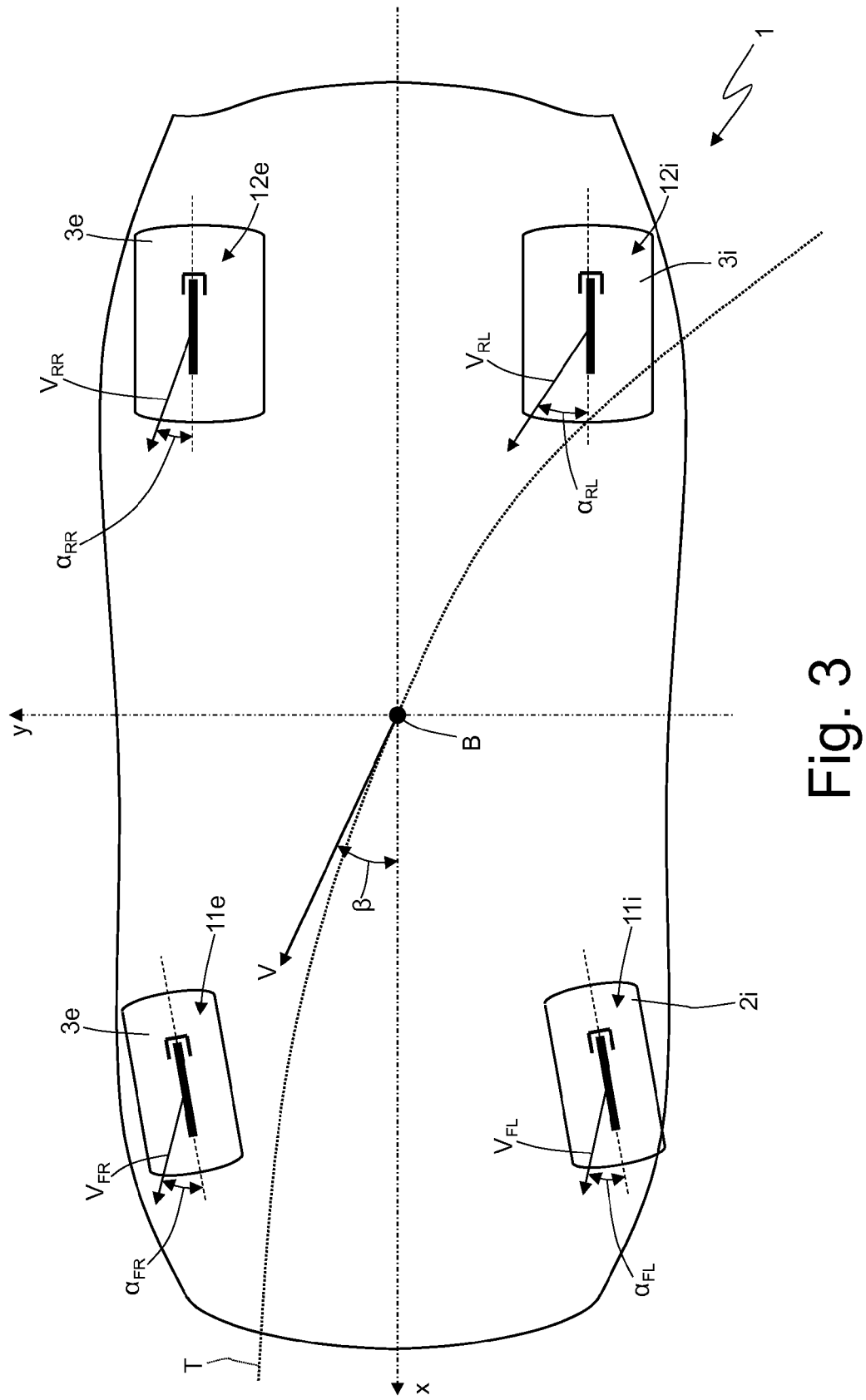
FIG. 3 is a diagrammatic view of the vehicle in FIG. 1 with the vehicle sideslip angle and a wheel slip angles highlighted.

As shown in FIG. 3, the control unit 22 initially determines the sideslip angle $\beta$ of the vehicle 1, i.e. the angle comprised between the longitudinal axis of the vehicle 1 and the direction of the velocity V of the vehicle 1 in the centre of gravity B; conventionally, the sideslip angle β is positive when the tail-end of the vehicle 1 is within the trajectory of the centre of gravity B, and the sideslip angle β is negative when the tail-end of the vehicle 1 is outside the trajectory of the centre of gravity B (as shown in FIG. 3, in which the sideslip angle β is negative). The control unit 22 estimates the trajectory T followed by the vehicle 1 using the measurements provided by the triaxial gyroscope 23 and by the satellite positioning system 24 in real time; in particular, the trajectory T is determined by integrating the accelerations measured by the triaxial gyroscope 23 twice over time, and the measurements provided by the satellite positioning system 24 are used to cyclically cancel the positioning errors which occur in the integration process. Furthermore, the control unit 22 estimates the velocity V of the vehicle 1 in the centre of gravity B using the measurements supplied by the triaxial gyroscope 23 in real time; in particular, the velocity V of the vehicle 1 in the centre of gravity B is determined by integrating the accelerations measured by the triaxial gyroscope 23 once over time (checking that the velocity V of the vehicle 1 in the centre of gravity B is actually tangent to the trajectory T followed by the vehicle 1, otherwise, in case of significant deviations in the comparison, a further iteration of the calculation is carried out making corrections to the parameters used).

The control unit 22 can easily determine the sideslip angle β of the vehicle 1 after having determined the velocity V of the vehicle 1 in the centre of gravity B. Starting from the sideslip angle β of the vehicle 1, the control unit 22 determines the slip angle α of each single wheel 2 or 3 by knowing the yaw angle of the vehicle 1 (the V yaw angle is obtained by integrating the angular yaw acceleration measured by the triaxial gyroscope 23 twice over time) and by applying simple geometric calculations based on the assumption that the vehicle 1 is a rigid body; in other words, the control unit 22 "takes" the sideslip angle β from the centre of gravity B to the hubs 15 of the single wheels 2 and 3, assuming that the vehicle 1 is a rigid body, the distance between centre of gravity B and the hubs 15, and the yaw angle of the vehicle 1 being known. In this manner, the control unit 22 estimates the slip angle $\alpha_{RR}$ of the right rear wheel 3, the slip angle $\alpha_{RL}$ of the left rear wheel 3, the slip angle $\alpha_{FR}$ of the right front wheel 3, and the slip angle $\alpha_{FL}$ of the left front wheel 3. The estimation of the slip angles α may be further refined by means of the iterative corrections which will be described below; however, the slip angle α estimate as described above is sufficient to estimate the transverse force Fy which is transferred by each wheel 2 or 3 to the ground with sufficient accuracy (particularly when the suspensions 11 and 12 are very rigid, as in the case of a high-performance sports car).

After having estimated the slip angles α of each wheel 2 or 3, the control unit 22 determines the vertical force Fz which is transferred by each wheel 2 or 3 to the ground (i.e. determines the vertical load which weights on each wheel 2 or 3). For this purpose, the control unit 22 calculates the total transverse force $Fy_{TOT}$ of the vehicle 1 by applying the equation ($Fy_{TOT}$=M*ay) which binds the mass M of the vehicle 1 (known beforehand), the side acceleration ay of the vehicle 1 (measured by the triaxial gyroscope 23) and the total transverse force $Fy_{TOT}$ of the vehicle 1. The total transverse force $Fy_{TOT}$ of the vehicle 1 and the mass M of the vehicle 1 being known, the control unit 22 estimates the vertical force Fz which is transferred by each wheel 2 or 3 to the ground by using a numeral model of the vehicle 1 (known in literature) based on the geometry of the suspensions 11 and 12 (according to a possible embodiment, the numerical model of the vehicle 1 may be iterative, i.e. include the execution of several subsequent calculation iterations for gradually refining the result).

Figure 4:
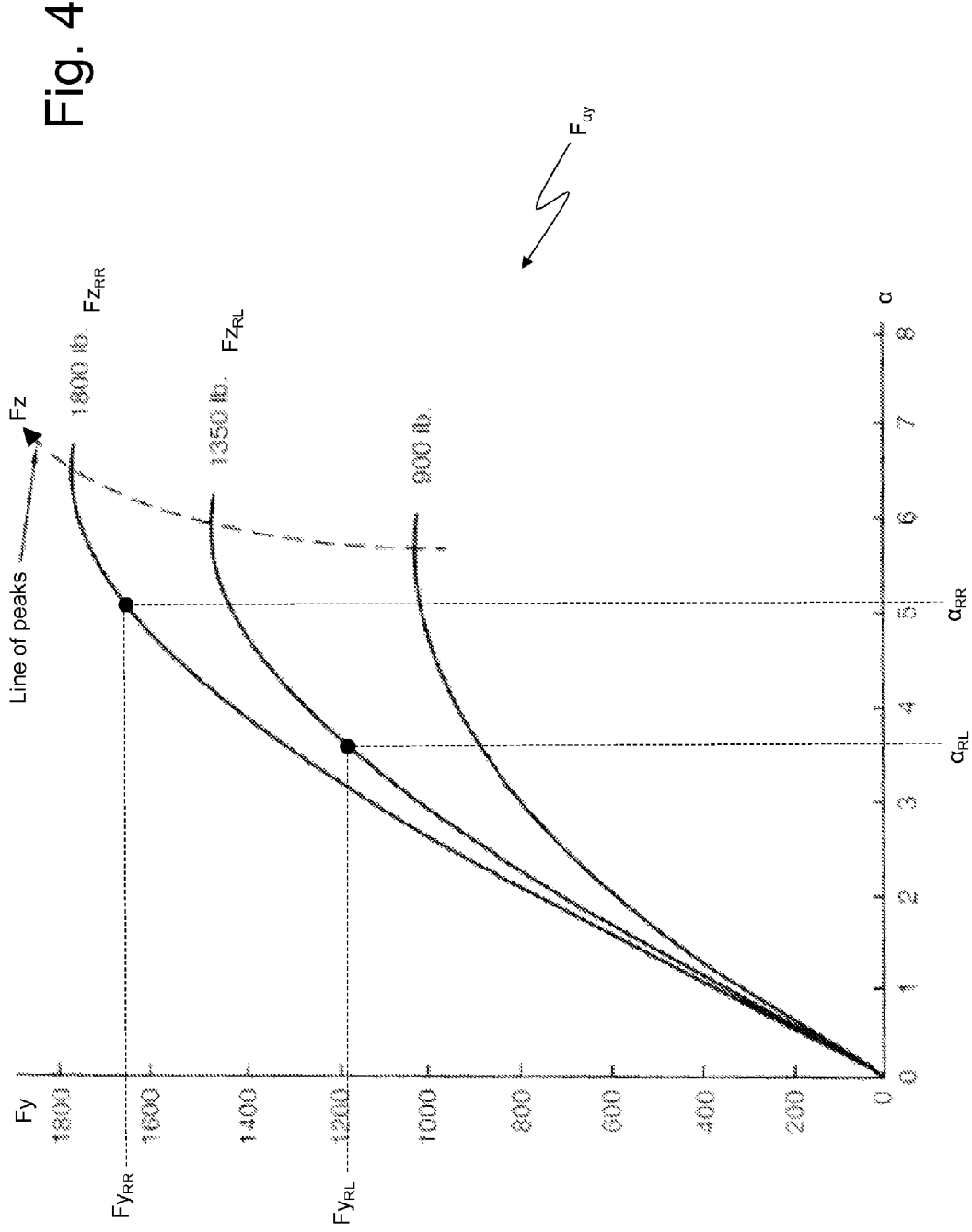

An empirical estimation function $F_{\alpha y}$ is stored in the control unit 22 (i.e. a function obtained empirically by means of measurements conducted on a laboratory vehicle 1 equipped with specific high-accuracy measuring instruments), which function supplies the transverse force Fy which is transferred by a wheel 2 or 3 to the ground as a function of the corresponding slip angle α and as a function of the vertical force Fz which is transferred by the wheel 2 or 3 to the ground (i.e. as a function of the vertical load which weighs on the wheel 2 or 3). An example of the estimation function $F_{\alpha y}$ is shown in FIG. 4, which shows that the transverse force Fy which is transferred by a wheel 2 or 3 to the ground increases as the slip angle α increases (to reach a maximum beyond which a saturation occurs, which makes the transverse force decrease Fy as the slip angle α increases) and shows that the transverse force Fy which is transferred by a wheel 2 or 3 to the ground increases and the vertical force Fz which is transferred by the wheel 2 or 3 to the ground increases (i.e. when the vertical load which weighs on the wheel 2 or 3 increases).

Using the estimation function $F_{\alpha y}$, the control unit 22 may determine the corresponding transverse force Fy for each wheel 2 or 3, the corresponding slip angle α and the corresponding vertical force Fz being known; it is worth noting that in this operation the steering angle (accurately known because it is measured by a position sensor coupled to the steering), which forms part of the slip angle α of the front wheels 2 but which does not provide any contribution to the generation of the transverse force Fy, must be preemptively subtracted from the slip angle α of front wheels 2. In the example shown in FIG. 4, the transverse force $Fy_{RL}$ of the left rear wheel 3 and the transverse force $Fy_{RR}$ of the rear right wheel 3: the transverse force $Fy_{RR}$ of the right rear wheel 3 is clearly higher than the transverse force $Fy_{RL}$ of the left rear wheel 3 because the rear right wheel 3e is the outer wheel of the corner while the left rear wheel 3i is the inner wheel of the corner (with reference to FIG. 3).

After having estimated the transverse force Fy of each wheel 2 or 3, the control unit 22 may check the correctness of the estimate described below. The control unit 22 calculates, as described above, the total transverse force $Fy_{TOT}$ of the vehicle 1 by applying the equation which binds the mass M of the vehicle 1 (known beforehand), the side acceleration ay of the vehicle 1 (measured by the triaxial gyroscope 23) and the total transverse force $Fy_{TOT}$ of the vehicle 1. The total transverse force $Fy_{TOT}$ of the vehicle 1 being known, the control unit 22 can estimate the transverse force Fy for each axle, i.e. the transverse force $Fy_R$ of the rear axle ($Fy_R$=$Fy_{RR}$+$Fy_{RL}$) and the transverse force $Fy_F$ of the rear axle ($Fy_F$=$Fy_{FR}$+$Fy_{FL}$) and by using a numerical model of the vehicle 1 (known in literature) based on the geometry of the suspensions 11 and 12; according to a possible embodiment, the numerical model of the vehicle 1 may be iterative, i.e. may include executing some subsequent calculation iterations to gradually refine the result. By comparing the transverse force $Fy_R$ or $Fy_F$ of the axle estimated starting from the total transverse force $Fy_{TOT}$ with the transverse force $Fy_R$ or $Fy_F$ of the calculated axle adding the estimations of the transverse forces Fy of the corresponding wheels 2 or 3 for each axle, it is possible to check the correctness of the estimates of the transverse forces Fy of each wheel 2 or 3: in case of significant deviations, the control unit 22 may repeat one or more iterations of the estimate of the transverse force Fy on each wheel 2 or 3 by making corrections to some parameters.

In order to refine the estimate of the slip angles α of each wheel 2 or 3, the control unit 22 may take the bump-steer effect into account, i.e. the tendency of the suspensions 11 and 12 to modify the toe angle (which directly affects the slip angle α) by varying the compression/expansion level, i.e. as a function of vertical juddering; in other words, the bump-steer effect is the geometric effect of the travel of each suspension 11 and 12 on the slip angle α. In order to take the bump-steer effect into account, the control unit 22 may estimate the vertical force Fz which is transferred by each wheel 2 or 3 to the ground (i.e. may determine the vertical loads which weigh on each wheel 2 or 3) as a function of the previously described methods, and thus the control unit 22 determines the compression/expansion level of the suspension 11 or 12 as a function of the vertical force Fz; finally, the control unit 22 estimates the bump-steer effect on the slip angle α (i.e. determines the correction to be applied to the previously estimated slip angle α) as a function of the compression/expansion level of the suspension 11 or 12 and using, for example, a previously stored empirical table.

The control unit 22 may take the effect of the transverse forces Fy which elastically deform the suspensions 11 and 12, tending to make the slip angles α of the front wheels 2 decrease and the slip angles α of the rear wheels 3 increase, into account in order to refine the estimation of the slip angles α of each wheel 2 or 3. Preferably, the control unit 22 uses a previously stored empirical table to estimate the transverse forces Fy on the slip angles α. The control unit 22 must use an iterative calculation method to take the effect of the transverse forces Fz into account: the control unit 22 initially assumes the values of the transverse forces Fy, which it uses to estimate the effect of the transverse forces Fy on the slip angles α (i.e. to estimate the corrections to be applied to the previously estimated slip angles α), and thus determines the values of the transverse forces Fy with greater accuracy using the estimates of the slip angles α and using such values of the transverse forces Fy updates the estimate of the effect of the transverse forces Fy on the slip angles α (obviously the control unit 22 may execute several subsequent iterations until a satisfactory toe is obtained).

The control unit 22 may take the effect of the longitudinal forces Fx which elastically deform the suspensions 11 and 12, tending to vary the slip angles α, into account in order to refine the estimate of the slip angles α of each wheel 2 or 3. Preferably, the control unit 22 uses a previously stored empirical table to estimate the longitudinal forces Fx on the slip angles α. In order to take the effect of longitudinal forces Fx into account, the control unit 22 estimates the longitudinal forces Fx transferred by each wheel 2 or 3 to the ground (both the torque applied on the rear drive wheels 3 by the internal combustion thermal engine 5, and the braking torque applied on the wheels 2 and 3 by the brakes being known), and thus by using the empirical table estimates the effect of the longitudinal forces Fx on the slip angles α (i.e. estimates the corrections to be applied to the previously estimated slip angles α).

Empirical control functions $F_C$ (i.e. obtained empirically by means of measurements carried out on a laboratory vehicle 1 equipped with specific high-accuracy measuring instruments), which supply the optimal toe and camber angles for each wheel 2 or 3 as a function of the transverse force Fy of the wheel 2 or 3, are stored in the control unit 22. Obviously, the control functions $F_C$ may be differentiated according to type of maneuver (e.g. the cornering control functions $F_C$ are different from the change of trajectory on a straight line control functions $F_C$), and above all, during cornering, the control functions $F_C$ are differentiated for the inner wheel 2i or 3i of the corner and for the outer wheel 2e or 3e of the corner. FIG. 5 shows, for example, an example of cornering control function $F_C$ which supplies the camber angle as a function of the transverse force Fy, and is differentiated for the outer wheel 2e or 3e of the corner (solid line) and for the inner wheel 2i or 3i of the corner (dashed line). FIG. 6 shows, for example, an example of cornering control function $F_C$ which supplies the toe angle as a function of the transverse force Fy, and is differentiated for the outer wheel 2e or 3e of the corner (solid line) and the inner wheel 2i or 3i of the corner (dashed line).

According to an embodiment, each spring/shock absorber 19 is provided with a position sensor (or speed sensor or acceleration sensor), which, is normally used in an active suspension control system and which supplies the position of the spring/shock absorber assembly 19 in real time. The position of the spring/shock absorber assemblies 19 may be used by the control unit 22 to further refine (i.e. to make more accurate) the estimate of the slip angles α of each wheel 2 or 3, in particular, the actual position of the spring/shock absorber assemblies 19 may be profitably used in the estimation of the vertical force Hz which weighs on each wheel 2 or 3 and in the estimation of the bump-steer effect on the slip angle α. The actual position of the spring/shock absorber assembly 19 may be used directly as calculation variable (i.e. may be entered directly into the equations which lead to the estimation), or the actual position of the spring/shock absorber assemblies 19 may be used indirectly as term of comparison; in the latter case, the control unit 22 compares the position of the spring/shock absorber assemblies 19 provided by a numerical model (which corresponds to virtual or simulated realty) with the corresponding position of the spring/shock absorber assemblies 19 read by the position sensors (which corresponds to physical reality), and, in case of significant differences, the control unit 22 corrects the results provided by the numerical model (e.g. by executing further calculation iterations possibly with corrected parameters).

The control unit 22 determines the traction forces applied on the rear drive wheels 3, the entity of the torque supplied by the internal combustion thermal engine 5 being known (value supplied by the control logic of the internal combustion thermal engine 5) and the current transmission ratio of the transmission 7 being known (value supplied by the control logic of the twin-clutch gearbox 9). Furthermore, the control unit 22 determines the longitudinal slip of the rear drive wheels 3 deriving from traction, the revolution speed of the drive shaft 6 being known (measurements supplied by the control logic of the internal combustion thermal engine 5), the current transmission ratio 7 being known (value supplied by the control logic of the twin-clutch gearbox 9), and the revolution speed of each rear drive wheel 3 being known (measurement supplied by the velocity sensors of the ABS).

The control unit 22 determines the longitudinal braking forces and the longitudinal slip deriving from braking of all wheels 2 and 3, the entity of the braking torque being known and the revolution speed of each wheel 2 and 3 being known (measurements supplied by the ABS pressure and speed sensors).

The control logic which is implemented in the control unit 22 to determine the optimal toe and camber angle values of the rear suspension 12 is described below.

In a rear suspension 12 of a high-power vehicle 1, increasing the performance of the tire on the ground mainly means increasing stability by increasing the transverse force and increasing traction by increasing the longitudinal force with respect to the values which can be reached by a similar passive suspension. Secondly, in order to increase the response of the rear axle so steering commands, a growth as rapid as possible with less final over-shoot of the transverse force on the rear axle is provided to confer a driving feeling and a trajectory accuracy to the vehicle 1 which are much higher than those of a similar vehicle provided with passive rear suspension 12.

In the case of change of trajectory on a straight line, an important discrimination is the sideslip angle β of the vehicle 1 measured in the centre of gravity B because an attempt is made to keep the sideslip angle β as close to zero as possible. In other words, in case of change of trajectory on a straight line, the main discriminating factor is whether the sideslip angle β is positive or whether the sideslip angle β is negative.

In case of a change of trajectory on a straight line, when the sideslip angle β is positive, the positive sideslip angle β, which produces a delayed, not very agile steering response, should be immediate cancelled; consequently, in case of a change of trajectory on a straight line, when the sideslip angle β is positive, the control unit 22 (by acting on the electromagnetic linear actuators 13 and 14) confers a negative (opening) toe angle to the rear suspensions 12 having a width such as to cancel the sideslip angle β of the vehicle 1 measured in the centre of gravity B. Preferably, the toe angles of the left and right rear suspensions 12 are mutually differentiated according to the different value of the transverse forces Fy of the outer rear wheel 3e and of the inner rear wheel 3i of the corner.

During cornering, it is initially (i.e. when entering the corner) necessary to apply a force on the rear wheels 3 to help the vehicle 1 turn, which force must be higher the slower the vehicle, and then (i.e. during cornering) it is necessary to apply a force on the rear wheels 3 which contrasts rotation to reduce all over-shoots of the vehicle 1 to rotation, side acceleration and yaw velocity.

During cornering, the control unit 22 (by acting on the electromagnetic linear actuators 13 and 14) initially (i.e. when entering the corner) confers a negative toe angle combined with a zero camber angle to the rear suspensions 12 and then (i.e. during cornering once the vehicle 1 in inscribed in the curvilinear trajectory, i.e. once the vehicle 1 has entered the corner) the control unit 22 (by acting on the electromagnetic linear actuators 13 and 14) confers a positive toe angle combined with a negative toe angle the rear suspension 12 to contrast rotation and thus reduce over-shoot. Preferably, the toe and camber angles of the left and right rear suspensions 12 are reciprocally differentiated according to the different value of the transverse forces Fy of the outer rear wheel 3e and of the inner rear wheel 3i of the corner (normally the outer rear wheel 3e has a strongly negative camber angle, while the inner rear wheel 3i slightly negative and close to zero).

During cornering, the toe angle (negative when entering the corner and positive during cornering) is always optimized with respect to the different side slip on the two rear wheels 3 so as to obtain the maximum force with the minimum slip. During cornering, the negative camber angle is an extra resource which allows to increase the transverse force on the outer rear wheel 3e of the corner to the limit of side grip by even 20%. Consequently, during cornering and when approaching the grip limit of the tires (i.e. when the transverse force Fy increase approaching the maximum point), the control unit 22 (by acting on the electromagnetic linear actuators 13 and 14) gradually reduces the positive toe angle (i.e. tends towards zero toe angle) to avoid saturating the transverse force; furthermore, during cornering and when approaching the grip limit of the tires, the control unit 22 (by acting on the electromagnetic linear actuators 13 and 14) gradually increases the absolute negative camber value (i.e. goes towards a negative camber angle of higher absolute value).

During cornering and when approaching the grip limit, the control unit 22 gradually increases the negative camber angle taking the roll and pitch position of the vehicle body into account and always maintains at least a zero camber angle on the outer rear wheel 3e of the corner (i.e. the camber angle of the outer rear wheel 3e of the corner is always lower than zero or at most equal to zero).

In brief, the control unit 22 confers negative toe angles combined with zero camber angles to the rear active suspension 12, when starting a curved trajectory T and when the vehicle 1 enters the curved trajectory T. Then, the control unit 22 confers positive toe angle values to the rear active suspension 12 combined with negative camber angles, during the curved trajectory T and when the vehicle 1 is inscribed in the curved trajectory T. When the vehicle 1 follows a curved trajectory T, the control unit 22 differentiates the toe and camber angle of the inner rear suspension 12i from the corner from the toe and camber angles of the outer suspension 12e of the corner: in particular, the camber angle of the inner rear suspension 12i of the corner has first negative values close to zero, while the camber value of the outer rear suspension 12e of the corner has second negative, considerably higher values, in absolute terms, than the first negative values. Preferably, on the curved trajectory T and when the vehicle 1 is inscribed in the curved trajectory T, the control unit 22 gradually reduces the absolute value of the positive toe angle of the outer rear suspension 12e and at the same time gradually increases the absolute value of the negative camber angle of the outer rear suspension 12e of the corner, gradually as the corresponding tire approaches the grip limit (i.e. when the transverse force Fy increases approaching the maximum point). Instead, on the curved trajectory T and when the vehicle 1 is inscribed in the curved trajectory T, gradually as the corresponding tires approaches the grip limit, the control unit 22 maintains the toe and camber angles of the inner rear suspension 12i of the corner essentially constant.

When exiting a corner whilst accelerating, the vehicle 1 must be allowed develop the maximum accelerating force possible, and it is therefore necessary to exploit the side of the tires of the rear wheels 3 as much as possible to dedicate as rapidly as possible the tires of the rear wheels 3 to transferring the longitudinal thrust only to the ground; this result is obtained by applying a negative camber angle and a zero toe angle (compatibly with the radius of the trajectory set by the driver) to the rear suspension 12. In other words, in case of exiting a corner while accelerating, the control unit 22 (by acting on the electromagnetic linear actuators 13 and d14) confers a zero toe angle combined with a sufficiently negative camber angle to maximize the longitudinal thrust capacity of the tires of the rear wheels 3 to the rear suspensions 12. Preferably, the camber angles of the left and right suspensions 12 are mutually differentiated because the inner rear wheel 3i of the corner has a lower vertical load and by slipping transfers torque to the outer rear wheel 3e by means of the self-locking differential.

In case of limit braking on a straight, the braking force must be maximized wheel by wheel. Thus, in case of limit braking on a straight, the control unit 22 (by acting on the electromagnetic linear actuators 13 and 14) confers a near zero toe angle combined with a zero camber angle to the rear suspension 12.

In case of limit braking when entering a corner, maintaining the narrowest trajectory to the apex of the corner is privileged avoiding to cause instability and, at the same time, attempting to exploit the longitudinal forces and reduce braking distance to the maximum extent. Thus, in case of limit braking when entering a corner, the control unit 22 (by acting on the electromagnetic linear actuators 13 and 14) confers a negative camber to guarantee a high transverse force to the tires of the rear wheels 3 to the rear suspensions 12; the negative camber angle is not (in absolute terms) high to prevent noticeably worsening the longitudinal force of the tires of the rear wheels 3.

In case of limit acceleration on a straight, the control unit 22 (by acting on the electromagnetic linear actuators 13 and 14) confers a zero camber angle to maintain the rear wheels 3 perpendicular to the ground and thus allow the tires of the rear wheels 3 to develop the maximum longitudinal traction force to the rear suspension 12; in case of limit acceleration on a straight, the control unit 22 (by acting on the electromagnetic linear actuators 13 and 14) confers a positive, small toe angle to promote stability to the rear suspension 12.

According to a possible embodiment, the control unit 22 may assess the driver's driving style (i.e. assessing whether the driver is "skillful" or "poor") and as a function of this assessment the control unit 22 may allow the vehicle 1 to approach its physical limits or not; in other words, as a function of this assessment, the control unit 22 establishes the entity of the "safety margin" to be maintained in all conditions.

The control method described above has many advantages, because it is, at the same time, easy and cost-effective to make and allows to manage the camber and toe angles of the suspensions in optimal manner, particularly when obtaining the maximum dynamic performance of a high-performance sports car is necessary.

The invention claimed is:

1. A control method for an active suspension of a vehicle, the control method comprises the steps of:
cyclically determining an optimal camber angle of the active suspension; and
driving the active suspension in order to confer the optimal camber angle to the active suspension;
wherein the step of determining the optimal camber angle comprises the further steps of:
determining a slip angle ($\alpha$) of a wheel of the active suspension;
determining a vertical force (Fz) weighing on the wheel of the active suspension;
determining a transverse force (Fy) which is transferred to the ground by the wheel of the active suspension; and
determining the optimal camber angle as a function of the transverse force (Fy) which is transferred to the ground by the wheel of the active suspension,
wherein the transverse force (Fy), which is transferred to the ground by the wheel of the active suspension, is estimated as a function of the slip angle ($\alpha$) of the wheel of the active suspension and as a function of the vertical force (Fz) which weighs on the wheel of the active suspension.

2. A control method according to claim 1 and comprising the further steps of:
cyclically determining an optimal toe angle for the active suspension as a function of the transverse force (Fy) which is transferred to the ground by the wheel of the active suspension; and
driving the active suspension in order to confer an optimal toe angle to the active suspension.

3. A control method according to claim 1, wherein the optimal camber angle increases with the increase of the transverse force (Fy) which is transferred to the ground by the wheel of the active suspension.

4. A control method according to claim 1, wherein the optimal camber angle is determined using an empirical control function ($F_C$) which provides the optimal camber angle as a function of the transverse force (Fy) which is transferred to the ground by the wheel of the active suspension.

5. A control method according to claim 4, wherein the empirical control function ($F_C$) varies depending on the type of maneuvers.

6. A control method according to claim 4, wherein the control function ($F_C$) varies, during cornering, for an inner wheel of the corner and for an outer wheel of the corner.

7. A control method according to claim 1, wherein the step of estimating the slip angle ($\alpha$) of the wheel of the active suspension further comprises the further steps of:
determining a sideslip angle ($\beta$) of the vehicle, the sideslip angle ($\beta$) being between a longitudinal axis of the vehicle and a direction of the velocity (V) of the vehicle in its center of gravity (B);
determining a yaw angle of the vehicle; and
determining the slip angle ($\alpha$) of the wheel of the active suspension as a function of the sideslip angle ($\beta$) of the vehicle and of the yaw angle of the vehicle under the assumption that the vehicle is a rigid body.

8. A control method according to claim 7, wherein the step of estimating the slip angle ($\alpha$) of the wheel of the active suspension comprises the further steps of:
determining a level of compression/extension of the active suspension as a function of the vertical force (Fz) weighing on the wheel of the active suspension;
estimating a bump-steer effect on the slip angle ($\alpha$) as a function of the level of one of compression and extension of the active suspension; and
correcting the slip angle ($\alpha$) of the wheel of the active suspension to compensate for the bump-steer effect.

9. A control method according to claim 7, wherein the step of estimating the slip angle ($\alpha$) of the wheel of the active suspension comprises the further steps of:
estimating effect of the transverse force (Fy) on the slip angle ($\alpha$), transverse force (Fy) being transferred to the ground by the wheel of the active suspension; and
correcting the slip angle ($\alpha$) of the wheel of the active suspension as a function of the effect of the transverse force (Fy) which is transferred to the ground by the wheel of the active suspension.

10. A control method according to claim 7, wherein the step of estimating the slip angle ($\alpha$) of the wheel of the active suspension comprises the further steps of:
estimating a longitudinal force (Fx) which is transferred to the ground by the wheel of the active suspension;
estimating effect of the longitudinal force (Fx) on the slip angle ($\alpha$), longitudinal force (Fx) being transferred to the ground by the wheel of the active suspension; and
correcting the slip angle ($\alpha$) of the wheel of the active suspension as a function of the effect of the longitudinal force (Fx) which is applied to the ground by the wheel of the active suspension.

11. A control method according to claim 1, wherein the step of estimating the vertical force (Fz) which weighs on the wheel of the active suspension comprises the further steps of:
measuring a side acceleration (ay) of the vehicle;
calculating a total transverse force ($Fy_{TOT}$) on the vehicle by multiplying the mass (M) of the vehicle by the side acceleration (ay) of the vehicle; and
estimating the vertical force (Fz) which weighs on the wheel of the active suspension as a function of the total transverse force ($Fy_{TOT}$) on the vehicle.

12. A control method according to claim 1, wherein the transverse force (Fy) is determined by using an empiric estimation function ($F_{\alpha y}$) which provides the transverse force (Fy) as a function of the slip angle ($\alpha$) of the wheel of the active suspension and as a function of the vertical force (Fz) which weighs on the wheel of the active suspension.

13. A control method according to claim 1 and comprising the further step of:
   measuring a steering angle of the front wheels of the vehicle; and
   subtracting beforehand the steering angle from the slip angle ($\alpha$) of one of the front wheels before estimating the transverse force (Fy) which is transferred to ground by the front wheel.

14. A control method according to claim 1 and comprising the further steps of:
   measuring a side acceleration (ay) of the vehicle;
   calculating a total transverse force ($Fy_{TOT}$) on the vehicle by multiplying the mass (M) of the vehicle by the side acceleration (ay) of the vehicle;
   estimating a transverse force ($Fy_R$) on the rear axle and/or the transverse force on the front axle ($Fy_F$) as a function of the total transverse force on the vehicle;
   comparing the transverse force ($Fy_R$, $Fy_F$) on a single axle with the sum of the transverse forces (Fy) on the two wheels of the same axle to check the correctness of the estimate of the transverse forces on the two wheels; and
   repeating, in case of significant deviations in the comparison, one or more iterations of the estimate of the transverse force (Fy) on each wheel by making corrections to at least one parameter.

* * * * *

(12) EX PARTE REEXAMINATION CERTIFICATE (10910th)
United States Patent
Ruiz

(10) Number: US 8,930,075 C1
(45) Certificate Issued: Jul. 20, 2016

(54) CONTROL METHOD OF AN ACTIVE SUSPENSION OF A CAR

(71) Applicant: Ferrari S.p.A., Modena (IT)

(72) Inventor: Isabel Ramirez Ruiz, Montale (IT)

(73) Assignee: FERRARI S.P.A., Modena (IT)

Reexamination Request:
No. 90/013,643, Dec. 9, 2015

Reexamination Certificate for:
Patent No.: 8,930,075
Issued: Jan. 6, 2015
Appl. No.: 13/734,452
Filed: Jan. 4, 2013

(30) Foreign Application Priority Data

Jan. 5, 2012 (IT) .............................. BO2012A0003

(51) Int. Cl.
*B60G 17/016* (2006.01)
*B60G 7/00* (2006.01)
*B60G 17/018* (2006.01)
*B62D 17/00* (2006.01)

(52) U.S. Cl.
CPC ............ *B60G 17/0163* (2013.01); *B60G 7/003* (2013.01); *B60G 17/0164* (2013.01); *B60G 17/0182* (2013.01); *B62D 17/00* (2013.01); *B60G 2200/46* (2013.01); *B60G 2200/4622* (2013.01); *B60G 2204/62* (2013.01); *B60G 2401/16* (2013.01); *B60G 2401/28* (2013.01); *B60G 2800/22* (2013.01); *B60G 2800/24* (2013.01); *B60G 2800/962* (2013.01)

(58) Field of Classification Search
None
See application file for complete search history.

(56) References Cited

To view the complete listing of prior art documents cited during the proceeding for Reexamination Control Number 90/013,643, please refer to the USPTO's public Patent Application Information Retrieval (PAIR) system under the Display References tab.

*Primary Examiner* — Mark Sager

(57) ABSTRACT

A control method for an active suspension of a vehicle, wherein the determination of an optimal camber angle of the active suspension includes the steps of: estimating the slip angle of the wheel of the active suspension; estimating the vertical force which weighs on the wheel of the active suspension; estimating the transverse force which is transferred to the ground by the wheel of the active suspension as a function of the slip angle of the wheel of the active suspension and as a function of the vertical force which weighs on the wheel of the active suspension; and determines the optimal camber angle as a function of the transverse force which is transferred to the ground by the wheel of the active suspension.

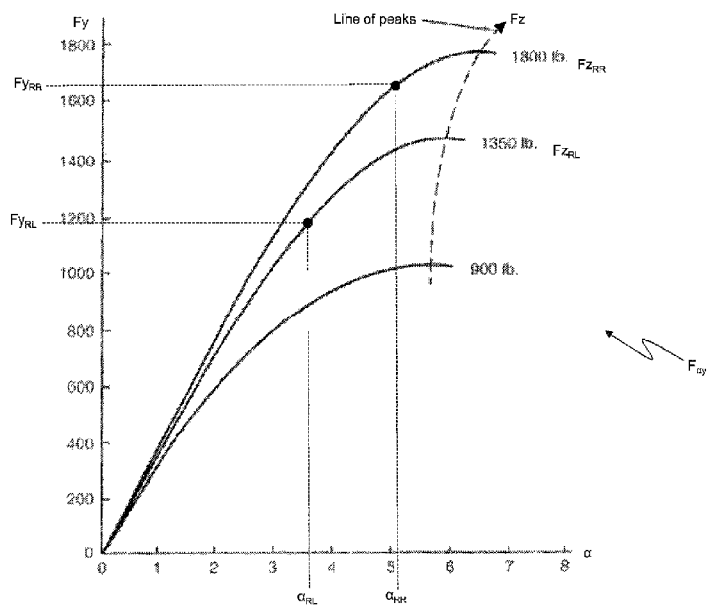

EX PARTE REEXAMINATION CERTIFICATE

NO AMENDMENTS HAVE BEEN MADE TO THE PATENT

AS A RESULT OF REEXAMINATION, IT HAS BEEN DETERMINED THAT:

The patentability of claim 1 is confirmed.

Claims 2-14 were not reexamined.

\* \* \* \* \*